United States Patent
Sharman (10) Patent No.: US 9,722,255 B2
(45) Date of Patent: Aug. 1, 2017

(54) CATALYST LAYER ASSEMBLY

(75) Inventor: Jonathan David Brereton Sharman, Reading (GB)

(73) Assignee: Johnson Matthey Fuel Cells Limited, London (GB)

( * ) Notice: Subject to any disclaimer, the term of this patent is extended or adjusted under 35 U.S.C. 154(b) by 354 days.

(21) Appl. No.: 13/516,914

(22) PCT Filed: Dec. 15, 2010

(86) PCT No.: PCT/GB2010/052092
§ 371 (c)(1),
(2), (4) Date: Aug. 23, 2012

(87) PCT Pub. No.: WO2011/073652
PCT Pub. Date: Jun. 23, 2011

(65) Prior Publication Data
US 2012/0321988 A1 Dec. 20, 2012

(30) Foreign Application Priority Data
Dec. 17, 2009 (GB) .................................. 0921996.5

(51) Int. Cl.
*H01M 8/10* (2016.01)
*H01M 4/88* (2006.01)
(Continued)

(52) U.S. Cl.
CPC ....... *H01M 4/8605* (2013.01); *H01M 4/8657* (2013.01); *H01M 4/8892* (2013.01); *H01M 8/1004* (2013.01)

(58) Field of Classification Search
CPC ............. H01M 8/10; H01M 4/88; B01J 35/06
(Continued)

(56) References Cited

U.S. PATENT DOCUMENTS 6,110,330 A 8/2000 Lin et al.
6,254,978 B1 7/2001 Bahar et al.
(Continued)

FOREIGN PATENT DOCUMENTS

EP 0 731 520 A1 9/1996
EP 0 814 897 B1 1/1998
(Continued)

OTHER PUBLICATIONS

Stonehart et al., *Modern Aspects of Electrochemistry*, No. 38, edited by B. E. Conway et al., Kluwer Academic/Plenum Publishers, New York, 2005, pp. 400-404.
(Continued)

*Primary Examiner* — Tracy Dove
(74) *Attorney, Agent, or Firm* — Fox Rothschild LLP (57) ABSTRACT

A reinforced catalyst layer assembly, suitably for use in a fuel cell, said reinforced catalyst layer assembly comprising: (i) a planar reinforcing component consisting of a porous material having pores extending through the thickness of the material in the z-direction, and (ii) a first catalyst component comprising a first catalyst material and a first ion-conducting material, characterized in that the first catalyst component is at least partially embedded within the planar reinforcing component, forming a first catalyst layer having a first surface and a second surface is disclosed.

18 Claims, 2 Drawing Sheets

Ohmic resistance measured by the current interrupt technique curve for a conventional MEA and an MEA with reinforced catalyst layers according to the invention. (Squares = conventional MEA, triangles = MEA of the invention).

(51) Int. Cl.
*H01M 4/86* (2006.01)
*H01M 8/1004* (2016.01)

(58) Field of Classification Search
USPC ........................................ 429/483, 523, 532
See application file for complete search history.

(56) References Cited

U.S. PATENT DOCUMENTS

| | | | |
|---|---|---|---|
| 2005/0048261 A1* | 3/2005 | Nishii | .................. C02F 1/50 |
| | | | 428/138 |
| 2007/0042268 A1 | 2/2007 | Pak et al. | |
| 2009/0098442 A1 | 4/2009 | Pak et al. | |
| 2009/0246592 A1 | 10/2009 | Kinoshita | |
| 2011/0275003 A1 | 11/2011 | Udatsu et al. | |

FOREIGN PATENT DOCUMENTS

| | | |
|---|---|---|
| EP | 1 063 334 A1 | 12/2000 |
| EP | 1 063 716 A2 | 12/2000 |
| EP | 2 037 521 A1 | 3/2009 |
| GB | 2 399 092 A | 9/2004 |
| JP | 08213027 A | 8/1996 |
| JP | 08329962 A | 12/1996 |
| JP | 2007048524 A | 2/2007 |
| WO | WO-97/11503 A1 | 3/1997 |
| WO | WO-2005/020356 A1 | 3/2005 |
| WO | WO-2005/034270 A1 | 4/2005 |
| WO | WO-2009/040571 A1 | 4/2009 |
| WO | WO-2009/109780 A1 | 9/2009 |
| WO | WO-2010/084753 A1 | 7/2010 |

OTHER PUBLICATIONS

International Search Report dated Feb. 2, 2011, from PCT International Application No. PCT/GB2010/052092.

GB Search Report dated Mar. 16, 2010, from GB Patent Application No. 0921996.5.

* cited by examiner

Figure 1: Polarisation curve for a conventional MEA and an MEA with reinforced catalyst layers according to the invention. (Squares = conventional MEA, triangles = MEA of the invention).

Figure 2: Ohmic resistance measured by the current interrupt technique curve for a conventional MEA and an MEA with reinforced catalyst layers according to the invention. (Squares = conventional MEA, triangles = MEA of the invention).

Figure 3: Schematic representation of the product of Example 2

CATALYST LAYER ASSEMBLY

CROSS-REFERENCE TO RELATED APPLICATIONS

This application is the U.S. National Phase application of PCT International Application No. PCT/GB2010/052092, filed Dec. 15, 2010, and claims priority of British Patent Application No. 0921996.5, filed Dec. 17, 2009, the disclosures of both of which are incorporated herein by reference in their entireties for all purposes.

FIELD OF THE INVENTION

The present invention relates to a reinforced catalyst layer assembly comprising a planar reinforcing component and a first catalyst component, a method for the preparation thereof, and its use in electrochemical devices, in particular fuel cells.

BACKGROUND OF THE INVENTION

A fuel cell is an electrochemical cell comprising two electrodes separated by an electrolyte. A fuel, such as hydrogen or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In proton exchange membrane (PEM) fuel cells, the electrolyte is a solid polymeric membrane. The membrane is electronically insulating but ionically conducting. In the PEM fuel cell the membrane is proton conducting, and protons, produced at the anode, are transported across the membrane to the cathode, where they combine with oxygen to form water.

The principle component of a PEM fuel cell is known as a membrane electrode assembly (MEA) and is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Conventionally, the MEA can be constructed by a number of methods outlined hereinafter:

(i) The electrocatalyst layer may be applied to the gas diffusion layer to form a gas diffusion electrode. Two gas diffusion electrodes can be placed either side of an ion-conducting membrane and laminated together to form the five-layer MEA;

(ii) The electrocatalyst layer may be applied to both faces of the ion-conducting membrane to form a catalyst coated ion-conducting membrane. Subsequently, gas diffusion layers are applied to both faces of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs; removing products; providing electrical connections; and providing physical support.

Conventional ion-conducting membranes used in the PEM fuel cell are generally formed from sulphonated fully-fluorinated polymeric materials (often generically referred to as perfluorinated sulphonic acid (PFSA) ionomers). Membranes formed from these ionomers are sold under the trade names Nafion® (e.g. NR211 or NR212 from E.I. DuPont de Nemours and Co.), Aciplex™ (Asahi Kasei) and Flemion® (Asahi Glass KK). Other fluorinated-type membranes include those sold under the trade name Fumapem® F (e.g. F-930 or F-1030 from FuMA-Tech GmbH), Aquivion™ from Solvay Solexis S.p.A and the GEFC-10N series from Golden Energy Fuel Cell Co., Ltd.

As an alternative to perfluorinated, and partly-fluorinated, polymer based ion-conducting membranes it is possible to use ion-conducting membranes based on non-fluorinated sulfonated or phosphonated hydrocarbon polymers, and in particular polyarylene polymers. Such commercially available polymers include Udel® polyarylenesulfone (PSU) and Veradel® polyarylene ether sulphone (PES) from Solvay Advanced Polymers, and Victrex® polyarylene ether ether ketone (PEEK™) from Victrex plc. Hydrocarbon polymer based membranes are also described, such as the Fumapem® P, E and K types from FuMA-Tech GmbH., JHY and JEM membranes from JSR Corporation, SPN polymer from Toyobo Co., Ltd., and developmental membranes from Toray Industries Inc.

In PEM fuel cells designed to operate at higher temperatures (e.g. 150° C. to 190° C.), the membrane may be a polymer such as polybenzimidazole, or polymer matrix, impregnated with phosphoric acid. Examples of MEAs made from such membranes include the Celtec®-P series from BASF Fuel Cell GmbH. Other MEAs include the Advent TPS® series based on aromatic polyether polymers incorporating pyridine type structures, also impregnated with phosphoric acid, from Advent Technologies S.A. Polybenzazole polymers can also be used such as ayrl or alkyl substituted polybenzimidazole (e.g. polybenzimidazole-N-benzylsulfonate), polybenzoxazoles and polybenzothiazoles.

The PFSA or hydrocarbon based ion-conducting membrane may contain a reinforcement, typically wholly embedded within the membrane, to provide improved mechanical properties such as increased tear resistance and reduced dimensional change on hydration and dehydration. The preferred reinforcement may be based on, but not exclusively, a microporous web or fibres of a fluoropolymer such as polytetrafluoroethylene (PTFE), as described in U.S. Pat. No. 6,254,978, EP 0814897 and U.S. Pat. No. 6,110,330, or polyvinylidene fluoride (PVDF), or alternative-materials-such as PEEK or polyethylene.

Conventionally, electrocatalyst layers are formed using well-known techniques, such as those disclosed in EP 0 731 520. The catalyst layer components may be formulated into an ink, comprising an aqueous and/or organic solvent, optional polymeric binders and optional proton-conducting polymer. The ink may be deposited onto an electronically conducting gas diffusion layer or an ion-conducting membrane using techniques such as spraying, printing and doctor blade methods.

The anode and cathode gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc, or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

Typical electrocatalysts are selected from
(i) the platinum group metals (platinum, palladium, rhodium, ruthenium, iridium and osmium),
(ii) gold or silver,
(iii) a base metal,
or an alloy or mixture comprising one or more of these metals or their oxides. The metal, alloy or mixture of metal may be unsupported or supported on a suitable support, for example particulate carbon. The electrocatalyst most appropriate for any given electrochemical device would be well known to those skilled in the art.

It has been found that using such components and constructing the MEA in such a manner can lead to a number of problems including cracking of the catalyst layers, which can lead to increased gas crossover, peroxide formation and thus increased membrane degradation; delamination at the catalyst layer to membrane interface and other mechanical failures due to expansion and contraction during wet and dry cycles experienced by the MEA.

SUMMARY OF THE INVENTION

It is the object of the present invention to provide improved assemblies for use in a fuel cell that overcome some of the problems associated with conventional MEA constructions.

Accordingly, a first aspect of the invention provides a reinforced catalyst layer assembly, suitably for use in a fuel cell, said reinforced catalyst layer assembly comprising:
(i) a planar reinforcing component consisting of a porous material having pores extending through the thickness of the material in the z-direction, and
(ii) a first catalyst component comprising a first catalyst material and a first ion-conducting material, characterised in that the first catalyst component is at least partially embedded within the planar reinforcing component, forming a first catalyst layer having a first surface and a second surface.

BRIEF DESCRIPTION OF THE DRAWINGS

The invention is illustrated by the accompanying drawings in which.

DETAILED DESCRIPTION OF THE INVENTION

The planar reinforcing component is a porous material having pores that extend through the thickness of the material in the z-direction. In one embodiment, the pores are discrete and not interconnected; in an alternative embodiment, there is some connectivity between the pores. The pores may be regular or irregular in shape, and suitably each individual pore has a cross-sectional diameter of from 1 mm to 10 nm. The pores may all be of essentially similar size or there may be a range of sizes. The pores may have low tortuosity (i.e. the pores extend essentially in a direct route from one face to the other) or alternatively, the tortuosity of the pores is high. The dimensions of the planar reinforcing component in the x- and y-directions will be dependent on the size of the final product incorporating the reinforced catalyst layer assembly; it is well within the capabilities of the skilled person to determine the most appropriate x- and y-dimensions. The dimension of the planar reinforcing component in the z-direction may be from 1 µm to 500 µm, and suitably from 10 µm to 200 µm. Exact dimensions will depend on the final structure and the use to which the reinforced catalyst layer assembly is put. Determination of the dimensions in the z-direction is well within the capabilities of the skilled person. The terms 'x-direction', 'y-direction' and 'z-direction' are well-known to the skilled person and meaning within the plane (x- and y-direction) and through the plane (z-direction).

The porosity of the planar reinforcing component is suitably greater than 30%, preferably greater than 50% and most preferably greater than 70%. The percentage porosity is calculated according to the formula $n=V_v/V_t \times 100$, wherein n is the porosity, $V_v$ is the voids volume and $V_t$ is the total volume of the planar reinforcing component. The voids volume and total volume of the planar reinforcing component can be determined by methods known to those skilled in the art.

A number of different structure types can be envisaged for the planar reinforcing component, but the pores should be connected rather than closed pores:

(i) A microporous structure wherein the pores are random in size and shape, but wherein the pores extend through the structure in the z-direction. Examples of such material include: polymers made porous by the inverse phase segregation method (e.g. Ultra High Molecular Weight Polyethylene (UHMWPE) from DSM), expanded PTFE and the like, non-woven structures made from assemblies of fibres orientated in many directions by wet or dry laid methods. Electrospinning of polymers can give suitable highly porous sheets as can other methods used to manufacture filters and the like.

(ii) A cellular structure, which comprises discrete cells, wherein the wall of each cell extends through the thickness of the material such that there is no inter-connection from one cell to other cells. Examples include: cellular structures made by extrusion and slicing or by partial lamination of strips and subsequent expansion under tension (such as Nomex® or Tyvec® from DuPont) or other means, woven meshes, meshes made by cutting slits in continuous sheets and applying tensile stress to form expanded meshes, planar sheets with holes punched or cut (e.g. by laser) through the thickness of the sheet, and porous sheets made by casting material into a mould.

The planar reinforcing component may be fabricated from any material and formation that will provide the required reinforcement of the reinforced catalyst layer assembly. Examples of suitable material from which the reinforcing component may be made include, but are not limited to metal, carbon, ceramic and polymer. In many embodiments it is desirable for the material to be an electrical insulator, but in others it should be a weak electrical conductor and in some cases it does not matter if the material conducts or not. Preferably the material is stable in the fuel cell environment and able to form a strong bond with any polymeric components in the final product incorporating the reinforced catalyst layer assembly.

In some embodiments, it is envisaged that the walls or struts of the planar reinforcing component will also be porous, on a fine scale. These pores are fine enough not to be penetrated by the construction materials of the MEA and are hydrophilic enough to allow water to fill the pores. Thus in suitable fuel cells, where liquid water is present, these pores can move water through the thickness or through the plane of the reinforcement.

Preferably, the planar reinforcing component could be sourced as a preformed material, for example woven webs produced from polymers containing fluorine, known as fluoropolymers, such as those supplied by Sefar AG (for example FLUORTEX), polytetrafluoroethylene (PTFE), ethylene tetrafluoroethylene (ETFE) or perfluoroalkoxyethylene (PFA), and microporous web structures of expanded polytetrafluoroethylene (ePTFE), such as those supplied by Donaldson Company, Inc., known as Tetratex or others. Alternative fluoropolymer structures such as those containing polyvinylidene fluoride (PVDF), perfluoroalkoxy(methyl vinyl ether) (MFA), fluorinated ethylene propylene (FEP) and a copolymer of hexafluoropropylene and tetrafluoroethylene may be used.

The planar reinforcing component may also be sourced as a preformed material such as woven webs produced from the group of polyaryletherketone polymers, such as those supplied by Sefar AG (for example PEEKTEX, polyetheretherketone (PEEK)) or others. Alternative polyaryletherketone polymer structures containing polyetherketone (PEK), polyarylether, polyaryletherkeone or polyetherkeoneetherketoneketone may be used. Alternative hydrocarbon based polymer structures which may be used are those containing imides or amides such as polyimides, polyetherimides, polyaramides, polybenzimidazoles, sulphur containing polymers such as poly(p-phenylene sulphide) (PPS) supplied by Toray Industries Inc. and Ticona UK Ltd., polyethers such as polyphenylene oxide (PPO) or polyolefins such as microporous Ultra High Molecular Weight Polyetheylene web film supplied by DSM N.V. and Lydall Inc. known as Solupor microporous web film.

Alternatively, the planar reinforcing component could be formed in situ, using methods such as ink jet printing or gravure printing using a low viscosity polymer dispersion or solution or monomers/oligomer to create the desired structure. The deposited material could be crosslinked or polymerised (using chemical or ionising radiation, UV etc.). An alternative method of producing a planar reinforcing material in situ is to use an electro-spinning technique to create an open nano fibre structure.

The first catalyst component comprises a first catalyst material and first ion-conducting material, suitably a proton conducting ionomer. Examples of suitable ion-conducting materials will be known to those skilled in the art and are typically provided as a dispersion of the ion-conducting material in a suitable liquid; examples include perfluorosulphonic acid ionomers (e.g. Nafion® (E.I. DuPont de Nemours and Co.), Aciplex® (Asahi Kasei), Aquivion™ (Solvay Solexis SpA), Flemion® (Asahi Glass Co.), Fumion® F-series (FuMA-Tech GmbH)), or ionomers made from hydrocarbon polymers (e.g. Fumion® P-series based on polyarylene sulphonic acid (FuMA-Tech GmbH) or phosphoric acid impregnated polybenzimidazole (e.g. by dissolving PBI in dimethylacetamide and mixing with the catalyst material and adding phosphoric acid to impregnate the PBI).

Suitable first catalyst materials are selected from
  (i) the platinum group metals (platinum, palladium, rhodium, ruthenium, iridium and osmium),
  (ii) gold or silver,
  (iii) a base metal,
  (the 'primary metal') or an alloy or mixture comprising one or more of these primary metals or their oxides. The primary metal, alloy or mixture of metal may be unsupported or supported on a suitable support, for example particulate carbon, or electrically conducting particulate oxides. The first catalyst material most appropriate for any given electrochemical device would be well known to those skilled in the art. The appropriate loading of the primary metal of the first catalyst material in the first catalyst component is dependent on the end use and would be known to those skilled in the art; suitably, the loading is less than 4 mg/cm$^2$, and preferably less than 2 mg/cm$^2$.

In the reinforced catalyst layer assembly of the invention, the first catalyst component is at least partially embedded within the planar reinforcing component such that a first catalyst layer is formed. By 'catalyst layer', it is meant a layer in which the dimensions in the x/y directions are considerably greater than in the z-direction so the catalyst layer could be considered planar. The first catalyst layer has a first surface, which is adapted to face an ion-conducting material when incorporated into a membrane electrode assembly and a second surface adapted to face a gas diffusion layer when incorporated into a membrane electrode assembly.

In one embodiment, the first catalyst component is completely embedded within the planar reinforcing component. The z-dimensions of the planar reinforcing component and the first catalyst layer may be the same or the z-dimension of the planar reinforcing component may be greater than the first catalyst layer, in which case the planar reinforcing component will extend beyond the first catalyst layer at one or both of the first and second surfaces of the first catalyst layer. If the planar reinforcing component extends beyond the second surface of the first catalyst layer, suitably it does not extend beyond the second surface by more than 50 μm.

Alternatively, it is possible that the z-dimension of the planar reinforcing component is less than that of the catalyst layer such that the catalyst layer extends beyond the planar reinforcing component in the z-direction at one or both surfaces of the planar reinforcing component.

The x- and y-dimensions ('area') of the first catalyst layer are suitably equal to, less than or greater than the x- and y-dimensions ('area') of the planar reinforcing component. In one embodiment of the invention, the areas of the planar reinforcing component and the first catalyst layer are equal such that the planar reinforcing component and first catalyst layer are co-extensive. In a second embodiment of the invention, the area of the first catalyst layer is less than the area of the planar reinforcing component, such that there is a region around the periphery of the reinforcing component ('first edge region') in which no first catalyst layer is present. The first edge region may be at least partially filled with a non-ion-conducting material.

In another embodiment, the planar reinforcing component may not extend to the centre of the first catalyst layer such that only the outer region of the first catalyst layer is reinforced, whilst the inner region remains un-reinforced.

The reinforced catalyst layer of the invention may be made by applying the first catalyst component in the form of an ink to a substrate, for example a decal transfer substrate, and while the ink is still wet, applying the planar reinforcing component such that the first catalyst component impregnates and becomes embedded within the planar reinforcing component. The first catalyst component is then dried to form a first catalyst layer embedded at least partially within the planar reinforcing component and the substrate removed to leave a reinforced catalyst layer assembly of the invention. By varying the thickness of the wet ink film, the top surface of the catalyst layer may be made to lie below or above or co-extensive with the top surface of the planar reinforcing component. Alternatively, the first catalyst component in the form of an ink may be sprayed into the planar reinforcing component, whilst it resides on a decal transfer substrate, or the ink may be sprayed from both sides such that the droplets coalesce within the pores of the planar reinforcing component. The amount of ink added can be adjusted such that the surface of the dry catalyst layer stands proud of the planar reinforcing component on one or both sides, or lies within the reinforcing component on one or both sides.

The first catalyst component may be made in the form of a dough using suitable rheology modifiers or by fibrillating PTFE by high shear blending within the first catalyst component. Such a dough can then be combined with the planar reinforcing component, provided the largest particles of the first catalyst component are smaller than the smallest pores within the planar reinforcing component. Impregnation of the catalyst dough into the planar reinforcing component can be achieved by co-extrusion, calendaring or pressing. If the face of the tool forcing the dough into the planar reinforcing component is of suitable compressibility, the surface of the first catalyst component can be made to lie below the surface of the planar reinforcing component on one or both sides.

Further the first catalyst component can be made in the form of a dry powder and applied to the planar reinforcing component by dry spray deposition, electrostatic spray or other electrostatic methods, such as those used in photocopiers, either with the planar reinforcing component resting on a decal substrate or being accessible from both sides.

To combine the first catalyst component with the planar reinforcing component such that the first catalyst component is wholly embedded in the reinforcing component, the first catalyst component can be deposited into the reinforcing component in the form of an ink from one or both sides. Upon drying, the loss of solvent leads to shrinkage such that both surfaces of the first catalyst component recede within the reinforcing component. Alternatively, a thermally decomposable, sublimatable or soluble material can be added to partly fill, or blind, the pores of the reinforcing component, preferably resting on a substrate, before the catalyst component is added, which would not completely fill the reinforcing component, or would shrink back during drying. Once the catalyst component is dry, the blinding material can be removed by thermal decomposition, sublimation or washing.

A second aspect of the invention provides a reinforced catalyst layer assembly as hereinbefore described, and which further comprises an ion-conducting component applied to the first surface of the first catalyst layer forming an ion-conducting layer having a first surface and a second surface wherein the first surface is in contact with the first surface of the first catalyst layer. The ion-conducting component may be at least partially embedded within the planar reinforcing component, wholly embedded within the planar reinforcing component or wholly embedded within the planar reinforcing component such that the planar reinforcing component extends beyond the ion-conducting component in the z-direction.

In one embodiment, there may also be an overlap of the first catalyst layer and the ion-conducting component such that an interphase layer of graded composition is obtained. By this, we mean that there is a zone of finite thickness between the catalyst layer and the ion-conducting component over which the composition varies progressively.

The ion-conducting component forms a layer, the layer being of similar area (x- and y-dimensions) to the area of the planar reinforcing component such that the two are essentially co-extensive. Alternatively, the planar reinforcing component is of greater area than the ion-conducting layer, such that there is a region around the periphery of the reinforced catalyst layer assembly ('second edge region') in which no ion-conducting component is present. The second edge region may be at least partially filled with a non-ion-conducting material.

The ion-conducting component is an ionomer (e.g. a perfluorosulphonic acid ionomer or hydrocarbon ionomer as hereinbefore described), or a polymer matrix impregnated or impregnatable with an electrolyte (e.g. phosphoric acid or sulphuric acid). The ion-conducting component selected will be dependent on the ultimate use of the reinforced catalyst layer assembly and is within the ability of the skilled person to select the most appropriate material.

The ion-conducting component can be applied to the first catalyst layer, as a dispersion in a suitable liquid, by any technique known in the art, for example screen printing, rotary screen printing, inkjet printing, spraying, painting, immersion or dipping, bar coating, pad coating, gravure, gap coating techniques such as knife or doctor blade over roll (whereby the coating is applied to the substrate then passes through a split between the knife and a support roller), air knife coating (whereby the coating is applied to the substrate and the excess is 'blown off' by a powerful jet from the air knife), slot die (slot, extrusion) coating (whereby the coating is squeezed out by gravity or under pressure via a slot onto the substrate), metering rod application such as with a Meyer bar and gravure coating. Suitably, the ion-conducting component is dried to remove the liquid and form a solid film of the ion-conducting component.

Alternatively the ion-conducting component may be a pre-formed polymer film, and it may be applied to the first catalyst layer in solid form by hot pressing in a press or hot calendar rolls.

In a yet further aspect of the invention, the reinforced catalyst layer assembly as hereinbefore described and which also comprises an ion-conducting layer, may further comprise a second catalyst component, comprising a second catalyst material and a second ion-conducting material, applied to the second surface of the ion-conducting layer, the second catalyst component forming a second catalyst layer having a first surface and a second surface, wherein the first surface is in contact with the second surface of the ion-conducting layer. By 'catalyst layer', it is meant a layer in which the dimensions in the x/y directions are considerably greater than in the z-direction so the catalyst layer could be considered planar.

The second catalyst component comprises a second catalyst material and a second ion-conducting material, suitably a proton conducting ionomer. Examples of suitable ion-conducting materials will be known to those skilled in the art and are typically provided as a dispersion of the ion-conducting material in a suitable liquid; examples include perfluorosulphonic acid ionomers (e.g. Nafion® (E.I. DuPont de Nemours and Co.), Aciplex® (Asahi Kasei), Aquivion™ (Solvay Solexis SpA), Flemion® (Asahi Glass Co.), Fumion® F-series (FuMA-Tech GmbH)), ionomers made from hydrocarbon polymers (e.g. Fumion® P-series based on polyarylene sulphonic acid (FuMA-Tech GmbH) or phosphoric acid impregnated polybenzimidazole (e.g. by dissolving PBI in dimethylacetamide and mixing with the catalyst material and adding phosphoric acid to impregnate the PBI).

Suitable second catalyst materials are selected from
(iv) the platinum group metals (platinum, palladium, rhodium, ruthenium, iridium and osmium),
(v) gold or silver,
(vi) a base metal,
(the 'primary metal') or an alloy or mixture comprising one or more of these primary metals or their oxides. The primary metal, alloy or mixture of metal may be unsupported or supported on a suitable support, for example particulate carbon. The second catalyst material most appropriate for any given electrochemical device would be well known to those skilled in the art. The appropriate loading of the primary metal of the second catalyst material in the second catalyst component is dependent on the end use and would be known to those skilled in the art; suitably, the loading is less than 4 mg/cm$^2$, and preferably less than 2 mg/cm$^2$. The second catalyst component may be the same or different to the first catalyst component.

The second catalyst component may be not embedded within the planar reinforcing component, at least partially embedded within the planar reinforcing component or wholly embedded within the planar reinforcing component. If wholly embedded within the planar reinforcing component, the planar reinforcing component may extend beyond the second surface of the second catalyst layer in the z-direction, but suitably not by more than 50 microns.

The second catalyst layer may be of similar area (x- and y-dimensions) to the planar reinforcing component such that the two are essentially co-extensive. Alternatively, the planar reinforcing component is of greater area than the second catalyst layer, such that there is a region around the periphery of the reinforced catalyst layer assembly ('third edge region') in which no second catalyst layer is present. The third edge region may be at least partially filled with a non-ion-conducting polymer. Alternatively, the area of the second catalyst layer is greater than the area of the planar reinforcing component.

In another embodiment, the planar reinforcing component may not extend to the centre of the second catalyst layer such that only the outer region of the second catalyst layer is reinforced, whilst the inner region remains un-reinforced.

The second catalyst component in liquid ink form can be applied direct to the ion-conducting layer by any method known to those in the art, for example screen printing, rotary screen printing, inkjet printing, spraying, painting, immersion or dipping, bar coating, pad coating, gravure, gap coating techniques such as knife or doctor blade over roll (whereby the coating is applied to the substrate then passes through a split between the knife and a support roller), air knife coating (whereby the coating is applied to the substrate and the excess is 'blown off' by a powerful jet from the air knife), slot die (slot, extrusion) coating (whereby the coating is squeezed out by gravity or under pressure via a slot onto the substrate), metering rod application such as with a Meyer bar and gravure coating. Alternatively, the second catalyst component may be first applied in the form of an ink to a substrate, for example a decal transfer substrate, and while the ink is still wet, applied to the ion-conducting layer, dried and the substrate removed.

The second catalyst component may also be made in the form of a dough using suitable rheology modifiers or by fibrillating PTFE by high shear blending within the first catalyst component. Such a dough can then be applied to the ion-conducting layer by co-extrusion, calendaring or pressing.

Further the second catalyst component can be made in the form of a dry powder and applied to the ion-conducting layer by dry spray deposition, electrostatic spray or other electrostatic methods such as those used in photocopiers.

In a still further aspect of the invention, the reinforced catalyst layer assembly as hereinbefore described further comprises a first microporous layer present on the second surface of the first catalyst layer and/or a second microporous layer present on the second surface of the second catalyst layer. The first and/or second microporous layers may independently be at least partially embedded within the planar reinforcing component or not embedded within the planar reinforcing component. The planar reinforcing component does not extend beyond the exposed surface of the first and/or second microporous layers. The first and/or second microporous layer independently comprises a particulate material, such as a carbon black, and a polymer, such as a hydrophobic polymer. An example of a suitable polymer is for example PTFE, suitably the PTFE is pre-fired on the carbon and the combination of PTFE and carbon is then applied onto the first and/or second catalyst layer assembly as a dry powder or by dispersing in a suitable dispersant such as water thickened with methyl cellulose, or an organic dispersant such as 1-methoxy 2-propanol.

The first and second microporous layers are applied to the first and second catalyst layer respectively by methods known to those in the art, for example screen printing, rotary screen printing, inkjet printing, spraying, painting, immersion or dipping, bar coating, pad coating, gravure, gap coating techniques such as knife or doctor blade over roll (whereby the coating is applied to the substrate then passes through a split between the knife and a support roller), air knife coating (whereby the coating is applied to the substrate and the excess is 'blown off' by a powerful jet from the air knife), slot die (slot, extrusion) coating (whereby the coating is squeezed out by gravity or under pressure via a slot onto the substrate), metering rod application such as with a Meyer bar and gravure coating.

Alternatively, the substrate onto which the reinforced catalyst layer assembly of the invention is first made could be a gas diffusion layer which has a first microporous layer already thereon. Depending on whether the first microporous layer is to be at least partially embedded within the planar reinforcing component, the first microporous layer is applied to a gas diffusion substrate and either (i) the planar reinforcing component is applied to the wet first microporous layer such that the first microporous layer at least partially embeds within the planar reinforcing component, the microporous layer is allowed to dry and a first catalyst layer is applied to the microporous layer such that it embeds within the planar reinforcing layer and the first catalyst layer is allowed to dry, or (ii) the microporous layer is allowed to dry, a first catalyst layer is applied to the microporous layer and while still wet, a planar reinforcing component is applied to the first catalyst layer, such that the first catalyst layer at least partially embeds within the planar reinforcing layer and the first catalyst layer is allowed to dry.

A yet further aspect of the invention provides a reinforced catalyst layer assembly comprising two reinforced catalyst layer assemblies each comprising a planar reinforcing component and a first catalyst layer and wherein at least one of the reinforced catalyst layer assemblies further comprises an ion-conducting layer. If only one of the two assemblies comprises an ion-conducting layer, the assemblies are combined such that the ion-conducting layer in the assembly comprising the ion-conducting layer contacts the first catalyst layer of the other assembly. If both assemblies comprise an ion-conducting layer, the assemblies are combined such that the two ion-conducting layers contact each other.

The catalyst layer assemblies can be combined by methods suited to the nature of the ion-conducting components. For example, where the ion-conducting component is an ionomer, joining can be by hot-pressing in a press or using hot calendar rolls or by bonding with liquid ion-conducting polymer, such as a solvent or water borne dispersion, or by hot bonding with a separate sheet of solid ion-conducting polymer, by pressing or calendaring. The bonding agents, such as the liquid ion conducting polymer or separate sheet of ion conducting polymer, may be of different composition to the ion-conducting component within the catalyst layer assemblies. For example, a hydrocarbon ion conducting bonding agent may be used between PFSA ion-conducting polymers to reduce the amount of gas crossover, since hydrocarbon ionomers are less gas permeable than PFSA ionomers.

The reinforced catalyst layer assemblies of the invention may further comprise an additive. The additive may be present at one or more of the interfaces between the various layers and/or within one or more of the layers.

The additive may be one or more selected from the group consisting of hydrogen peroxide decomposition catalysts, radical scavengers, free radical decomposition catalyst, self regenerating antioxidant, hydrogen donors (H-donor) primary antioxidant, free radical scavenger secondary antioxidant, oxygen absorbers (oxygen scavenger). Examples of these different additives may be found in WO2009/040571 and WO2009/109780. A preferred additive is cerium dioxide (ceria).

In a preferred embodiment of the invention, the reinforced catalyst layer assembly is used in a fuel cell, in particular a PEM fuel cell.

Accordingly, a further aspect of the invention provides a gas diffusion electrode comprising a gas diffusion layer and a reinforced catalyst layer assembly according to the invention. The gas diffusion layer may be a conventional gas diffusion layer as typically used in the art and described hereinbefore.

A further aspect of the invention provides a reinforced catalyst layer membrane assembly comprising a reinforced catalyst layer assembly of the invention and an ion-conducting membrane. The ion-conducting membrane is a pre-formed membrane and may be a conventional membrane as used in the art and described hereinbefore. The reinforced catalyst layer membrane assembly may comprise a second reinforced catalyst layer assembly of the invention wherein the ion-conducting membrane is sandwiched between the two reinforced catalyst layer assemblies.

A still further aspect of the invention provides a membrane electrode assembly comprising a reinforced catalyst layer assembly, a gas diffusion electrode or a reinforced catalyst layer membrane assembly of the invention.

The membrane electrode assembly may further comprise components that seal and/or reinforce the edge regions of the membrane electrode assembly for example as described in WO2005/020356. The MEA is assembled by conventional methods known to those skilled in the art, for example as described hereinbefore.

A yet further aspect of the invention provides a fuel cell comprising a reinforced catalyst layer assembly, a gas diffusion electrode, a reinforced catalyst layer membrane assembly or a membrane electrode assembly as hereinbefore described.

The reinforced catalyst layer assembly and other components of the invention provide a number of improvements over the state-of-the-art products. Deformation in both the xy plane and the z plane will be reduced, which will lead to reduced cracking of the layers and therefore reduced crossover. Furthermore, mechanical failure will be reduced since expansion and contraction of the final product incorporating the reinforced catalyst layer assembly will be minimised because of the constraining effect of the reinforcement. Furthermore, delamination at interfaces, which is seen in many state-of-the-art products, will be less of, or no longer be, a problem.

Whilst the invention has been described primarily with reference to PEM fuel cells, the invention could equally well be used, with no or little modification, in other types of fuel cell or electrochemical device. For example, in phosphoric acid fuel cells (PAFCs) the two electrodes are conventionally separated by a matrix of particulate material, such as silicon carbide bound with polyether sulphone which has a porosity of greater than 38% (P. Stonehart and D. Wheeler, Modern Aspects of Electrochemistry, Number 38, edited by B. E. Conway et al, Kluwer Academic/Plenum Publishers, New York, 2005, p. 400 et seq). The present invention allows the matrix to be replaced by the porous reinforcing material, impregnated with phosphoric acid, provided a material of suitable resistance to hot phosphoric acid and wettable by phosphoric acid is used, such as silicon carbide, polyether sulphone, PEEK, poorly conducting carbon fibres and other materials shown to have suitable stability.

In alkaline fuel cells the electrolyte is typically strong sodium or potassium hydroxide and the electrodes are separated by a matrix in a similar manner to that described for PAFCs. The present invention is quite suitable for MEAs for use in alkaline fuel cells provided the porous reinforcing component is stable in and wetted by the alkaline electrolyte.

All of the embodiments described for PEM fuel cells apply equally to MEAs for PEM electrolysers. In these PEM electrolysers, a voltage is applied across the membrane electrode assemblies such that water supplied to the device is split into hydrogen and oxygen, at the cathode and anode respectively. The MEAs may require different catalyst components to a PEM fuel cell, such as Ir and Ru based materials at the anode, but are otherwise very similar to MEAs used for fuel cells.

EXAMPLES

The invention will now be further described with reference to the following example, which is illustrative, but not limiting of the invention.

Example 1

A reinforced catalyst layer membrane electrode assembly was created by a first step of hot pressing a 30 micron thick PFSA membrane (SH-30 from Asahi Glass) into a 50 micron thick woven PEEK (Sefar) reinforcement, with an open area (porosity) of 58%, at 150° C. and 1600 psi for 2 minutes. Because of the difference in thickness, the ionomer component was located to one side of the reinforcing layer, leaving approximately 20 microns of the woven material un-impregnated. Catalyst layers were added by hot pressing dried catalyst layers, supported on PTFE decal transfer substrates, to both sides of the ionomer-impregnated reinforcement at 150° C. and 800 psi for 2 minutes. In this way, an assembly was created with reinforced catalyst layers separated by an ion-conducting component.

Figure 1:
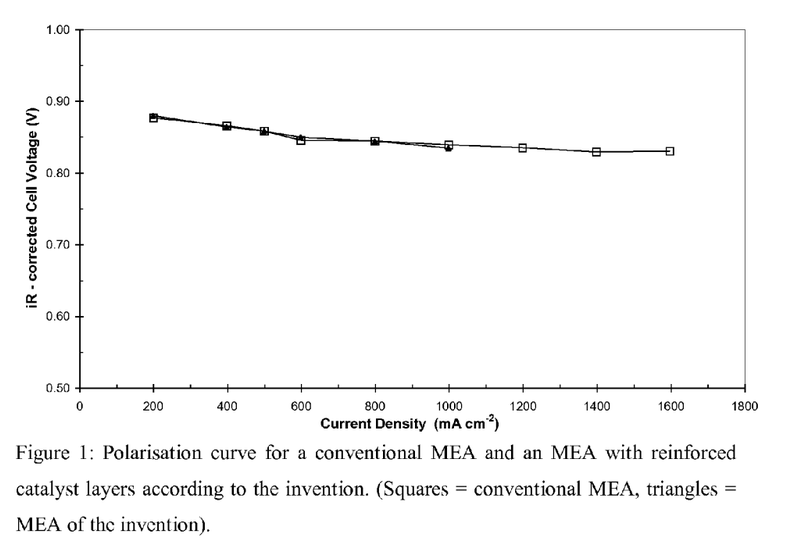
FIG. 1 is a polarization curve for a conventional membrane electrode assembly (MEA) (data points shown as squares) and an MEA according to the invention and as described in Example 2 (data points denoted as triangles)
Figure 2:
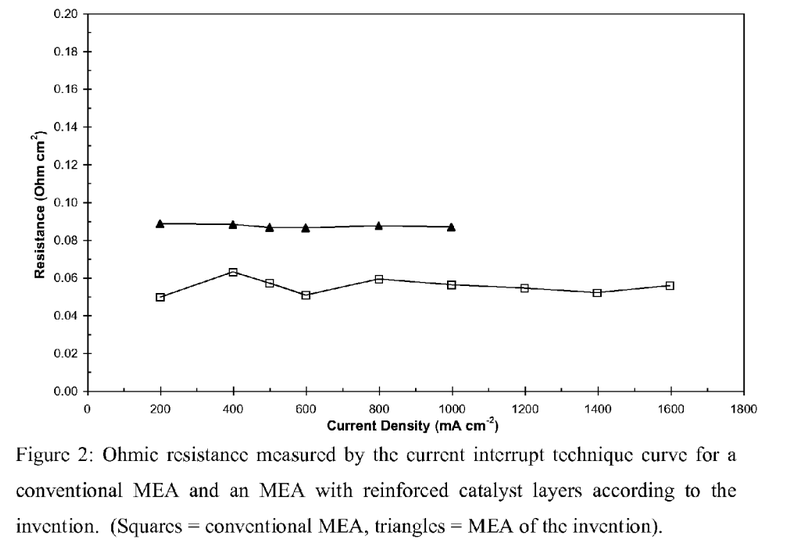
FIG. 2 is an ohmic resistance curve measured by the current interrupt technique for a conventional MEA (data points shown as squares) and an MEA according to the invention and as described in Example 2 (data points denoted as triangles)

The assembly was tested in a fuel cell by combining with gas diffusion layers, coated with microporous layers, and sealing into a test cell of 50 cm² active area. Hydrogen was supplied to the anode side and oxygen to the cathode side at a pressure of 100 kPa gauge and both gases were fully humidified. A polarisation curve was determined as shown in FIG. 1 and the ohmic resistance of the assembly determined using the current-interrupt method, as shown in FIG. 2. The cell voltage of the MEA containing the reinforced catalyst layer assembly was essentially the same as that of the conventional MEA, when corrected for ohmic (iR) losses. The ohmic losses were higher for the reinforced MEA by a factor of about two, consistent with the approximately 50% open area of the reinforcement.

Example 2

Figure 3:
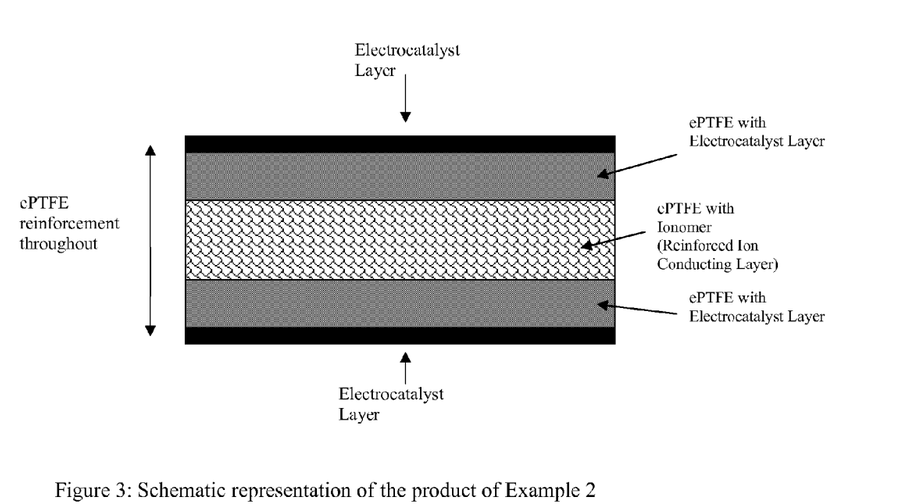
FIG. 3 is a schematic representation of the product of Example 2.

A reinforced membrane electrode assembly was created by first coating a thin layer of electrocatalyst ink, using a bar coater, onto skive PTFE which was subsequently oven dried at 105° C. A secondary layer of electrocatalyst ink was cast onto the pre-existing dry layer; whilst wet, a 15-20 micron thick expanded-PTFE web was laid into this secondary ink layer. Visible penetration of the ink into the e-PTFE matrix was observed. The interim assembly was again oven dried at 105° C. At this stage, the e-PTFE reinforcement material remained proud of the catalyst layer at one surface. An ion-conducting layer was then constructed by casting three ionomer layers onto the surface of the catalyst layer from which the e-PTFE was proud, with oven drying after each layer was applied. To complete the membrane electrode assembly, a further two coats of the electrocatalyst ink were applied to the assembly (with oven drying at each stage) resulting in the second catalyst layer. In the final product, the e-PTFE reinforcement material was entirely covered by the final electrocatalyst layer. In this way, an assembly was created in which the electrodes (anode and cathode), ionomer and electrode/ionomer interfaces of the MEA were reinforced by a continuous e-PTFE structure (see FIG. 3).

The invention claimed is:

1. A reinforced catalyst layer assembly, suitable for use in a fuel cell, said reinforced catalyst layer assembly comprising:
   (i) a planar reinforcing component formed from a porous material having pores extending through a thickness of the material in a z-direction, the planar reinforcing component having a first surface and a second surface, wherein each pore has a cross-sectional diameter of from 1 mm to 10 nm;
   (ii) a first catalyst layer having a first surface and a second surface, the first catalyst layer comprising a first ion-conducting material and a first primary metal, and having a first primary metal loading of less than 4 mg/cm²;
   (iii) a second catalyst layer having a first surface and a second surface, the second catalyst layer comprising a second ion-conducting material and a second primary metal, and having a second primary metal loading of less than 4 mg/cm²;
   (iv) an ion-conducting layer having a first surface and a second surface, wherein the first surface of the ion-conducting layer is in contact with the first surface of the first catalyst layer, and the second surface of the ion-conducting layer is in contact with the first surface of the second catalyst layer,
   wherein the planar reinforcing component extends through the thickness of the ion-conducting layer, extends into the first catalyst layer by an amount at least equal to the thickness of the first catalyst layer and not more than 50 μm beyond the second surface of the first catalyst layer, and extends into the second catalyst layer by an amount at least equal to the thickness of the second catalyst layer and not more than 50 μm beyond the second surface of the second catalyst layer.

2. The reinforced catalyst layer assembly according to claim 1, wherein the planar reinforcing component is formed from an expanded material, a woven or non-woven fabric or a cellular reinforcing material comprising a number of cells prepared from a metal, carbon, ceramic or polymer material.

3. The reinforced catalyst layer assembly according to claim 1, wherein the planar reinforcing component is made from a non-electrically conducting material.

4. The reinforced catalyst layer assembly according to claim 1, wherein a first microporous layer is present on the second surface of the first catalyst layer.

5. The reinforced catalyst layer assembly according to claim 1, wherein a second microporous layer is present on the second surface of the second catalyst layer.

6. A gas diffusion electrode comprising a gas diffusion layer and the reinforced catalyst layer assembly according to claim 1.

7. A membrane electrode assembly comprising the reinforced catalyst layer assembly according to claim 1.

8. A membrane electrode assembly comprising the gas diffusion electrode according to claim 6.

9. The reinforced catalyst layer assembly according to claim 1, wherein the planar reinforcing component is formed from a polymer selected from the group consisting of polytetrafluoroethylene, polyvinylidene fluoride, polyethyleneperfluoroalkoxy(methylvinylether), fluorinated ethylene propylene, and a copolymer of hexafluoropropylene and tetrafluoroethylene.

10. The reinforced catalyst layer assembly according to claim 1, wherein the planar reinforcing component in the z-direction ranges from 10 μm to 200 μm.

11. The reinforced catalyst layer assembly according to claim 1, wherein the planar reinforcing component has a porosity of greater than 70%.

12. The reinforced catalyst layer assembly according to claim 1, wherein the planar reinforcing component has pores that are random in size and shape.

13. The reinforced catalyst layer assembly according to claim 1, wherein the planar reinforcing component is formed from a polymer selected from the group consisting of polyaryletherketone polymers, polyimides, polyetherimides, polyaramides, polybenzimidazoles, Sulphur containing polymers and polyethers.

14. The reinforced catalyst layer assembly according to claim 1, wherein there is some connectivity between the pores.

15. The reinforced catalyst layer assembly according to claim 9, wherein the planar reinforcing component is formed from porous polytetrafluoroethylene.

16. The reinforced catalyst layer assembly according to claim 15, wherein the planar reinforcing component is formed from expanded polytetrafluoroethylene.

17. The reinforced catalyst layer assembly according to claim 1, wherein the planar reinforcing component is formed from carbon.

18. The reinforced catalyst layer assembly according to claim 1, wherein the planar reinforcing component is formed from ceramic.

* * * * *